(12) United States Patent
Ivarsson et al.

(10) Patent No.: US 10,118,139 B2
(45) Date of Patent: Nov. 6, 2018

(54) DEVICE FOR MIXING POWDER AND AT LEAST ONE OTHER TYPE OF PHASE

(71) Applicant: Peter-Nemo Lorens Fredrik Ivarsson, Enskede (SE)

(72) Inventors: Peter-Nemo Lorens Fredrik Ivarsson, Enskede (SE); Mats Rickard Andersson, Hörby (SE)

(73) Assignee: Peter-Nemo Lorens Fredrik Ivarsson, Enskede (SE)

( * ) Notice: Subject to any disclaimer, the term of this patent is extended or adjusted under 35 U.S.C. 154(b) by 656 days.

(21) Appl. No.: 14/409,734

(22) PCT Filed: Jun. 28, 2013

(86) PCT No.: PCT/SE2013/050822
§ 371 (c)(1),
(2) Date: Dec. 19, 2014

(87) PCT Pub. No.: WO2014/003681
PCT Pub. Date: Jan. 3, 2014

(65) Prior Publication Data
US 2015/0314251 A1 Nov. 5, 2015

(30) Foreign Application Priority Data

Jun. 29, 2012 (SE) ..................................... 1250738

(51) Int. Cl.
*B01F 7/00* (2006.01)
*B01F 5/06* (2006.01)
(Continued)

(52) U.S. Cl.
CPC .............. *B01F 5/0602* (2013.01); *A21C 1/02* (2013.01); *A21C 1/1435* (2013.01); *B01F 3/04* (2013.01);
(Continued)

(58) Field of Classification Search
CPC .................................................. B01F 7/00775
(Continued)

(56) References Cited

U.S. PATENT DOCUMENTS

| 64,099 A | * | 4/1867 | Hardy | .................... | C11D 13/00 |
| | | | | | 366/147 |
| 811,482 A | * | 1/1906 | Case | ...................... | A21C 11/18 |
| | | | | | 119/902 |

(Continued)

FOREIGN PATENT DOCUMENTS

| DE | 2031836 A1 | 12/1971 |
| EP | 0320480 A1 | 6/1989 |

(Continued)

OTHER PUBLICATIONS

International Search Report from PCT/SE2013/050822, dated Oct. 10, 2013, pp. 1-6.

(Continued)

*Primary Examiner* — David L Sorkin
(74) *Attorney, Agent, or Firm* — Meyertons, Hood, Kivlin, Kowert & Goetzel, P.C.; Mark R. DeLuca

(57) ABSTRACT

The present invention discloses a device for mixing a mixture material comprising at least two different phases where at least one first phase is in powdered form, said device comprising at least two separate inlets where a first inlet is intended for powder and a second inlet is intended for a second phase not being a powder, wherein the device further comprises an outlet and a mixing chamber with an agitator, wherein the mixing chamber comprises a mixing zone being that part of the mixing chamber in which the mixture material is being actively mechanically influenced to obtain mixing, and wherein said at least two separate inlets each involve any type of geometrical narrowing of their cross-sectional areas up to the mixing zone, and wherein the mixing zone further comprises any type of (Continued)

Figure 5:
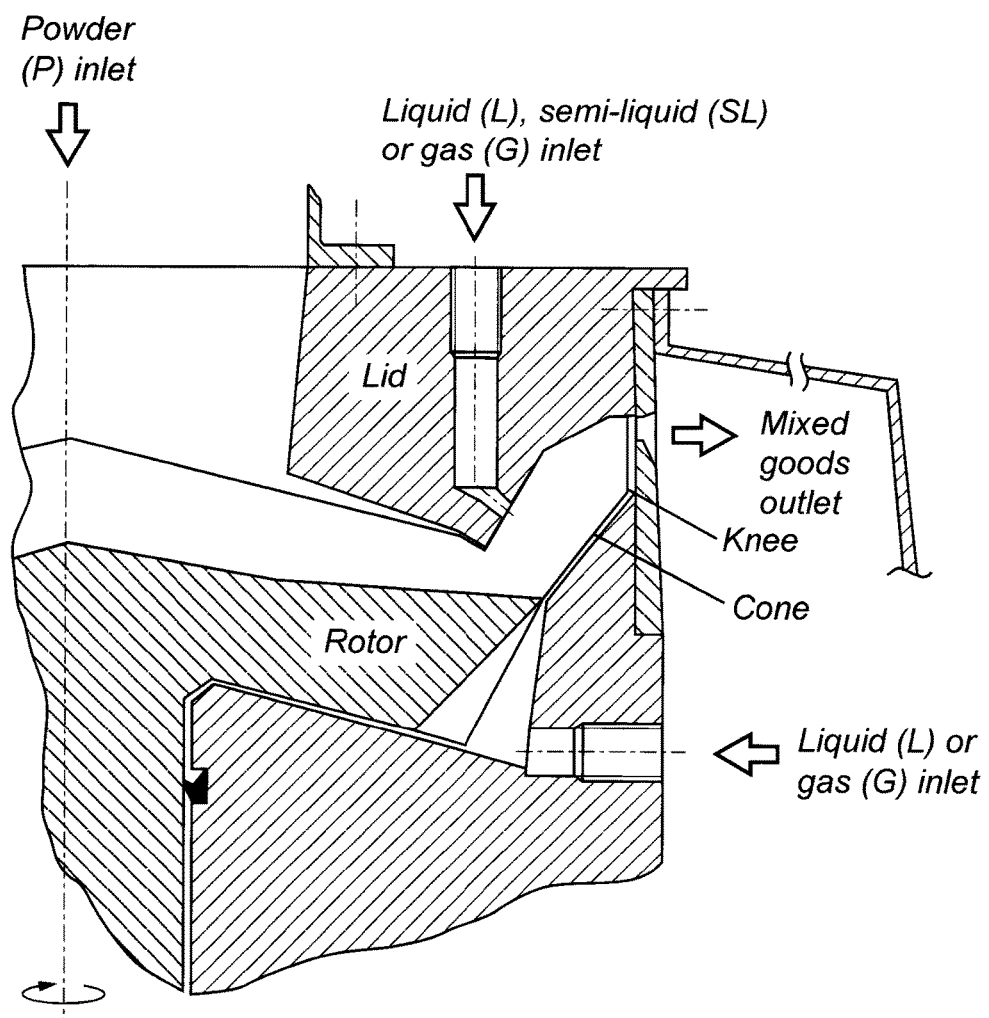

expansion of the cross-sectional area in a flow direction of the mixture material.

26 Claims, 4 Drawing Sheets

(51) Int. Cl.

| | | |
|---|---|---|
| *B01F 3/12* | (2006.01) | |
| *B01F 3/04* | (2006.01) | |
| *B01F 3/06* | (2006.01) | |
| *A21C 1/02* | (2006.01) | |
| *A21C 1/14* | (2006.01) | |
| *B01F 15/02* | (2006.01) | |

(52) U.S. Cl.
CPC ............... *B01F 3/06* (2013.01); *B01F 3/12* (2013.01); *B01F 3/1221* (2013.01); *B01F 7/00775* (2013.01); *B01F 15/0203* (2013.01)

(58) Field of Classification Search
USPC .......................................... 366/177.1, 181.4
See application file for complete search history.

(56) References Cited

U.S. PATENT DOCUMENTS

| | | | | |
|---|---|---|---|---|
| 3,385,569 A | * | 5/1968 | Bookout | ............... A47J 31/401 |
| | | | | 222/129.4 |
| 3,929,319 A | * | 12/1975 | Willemsen | ............... A47J 43/04 |
| | | | | 366/177.1 |
| 3,986,705 A | | 10/1976 | Nauta | |
| 4,096,587 A | | 6/1978 | Haller | |
| 4,190,373 A | * | 2/1980 | Zucker | ...................... B01F 5/02 |
| | | | | 366/160.2 |
| 4,329,066 A | | 5/1982 | Ivarson | |
| 4,498,783 A | * | 2/1985 | Rudolph | ............. B01F 15/0445 |
| | | | | 177/70 |
| 5,085,513 A | | 2/1992 | Ivarson | |
| 2011/0310695 A1 | * | 12/2011 | Sus | ...................... A23G 3/0065 |
| | | | | 366/177.1 |

FOREIGN PATENT DOCUMENTS

| | | |
|---|---|---|
| EP | 1008613 | 6/2000 |
| NL | 6911562 A | 2/1971 |
| WO | 8602630 A1 | 5/1986 |

OTHER PUBLICATIONS

Written Opinion from PCT/SE2013/050822, dated Oct. 10, 2013.
International Preliminary Report on Patentability from PCT/SE2013/050822, dated Dec. 31, 2014.
Supplementary Partial European Search Report, Application No. 13808610, dated Feb. 8, 2016, 7 pages.

* cited by examiner

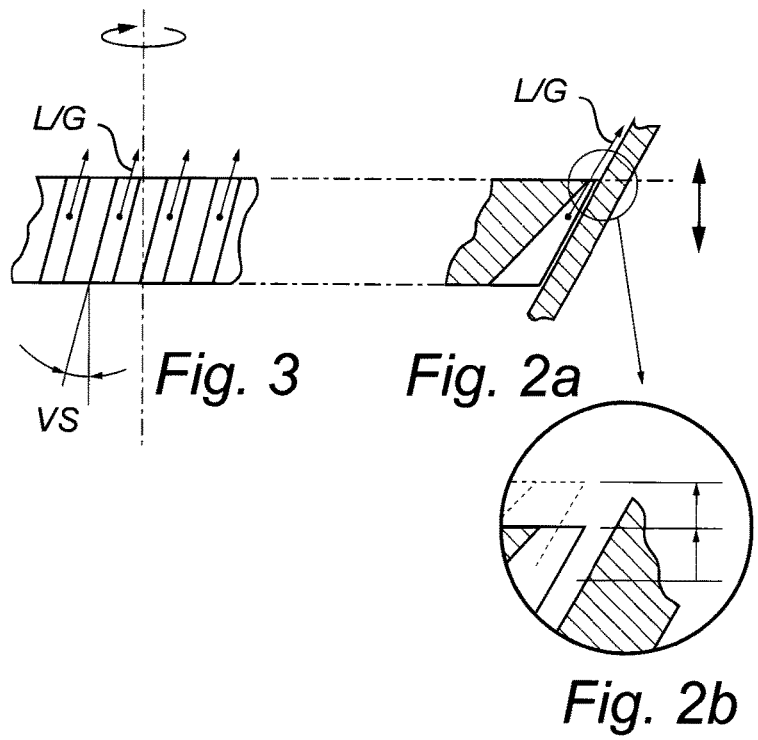
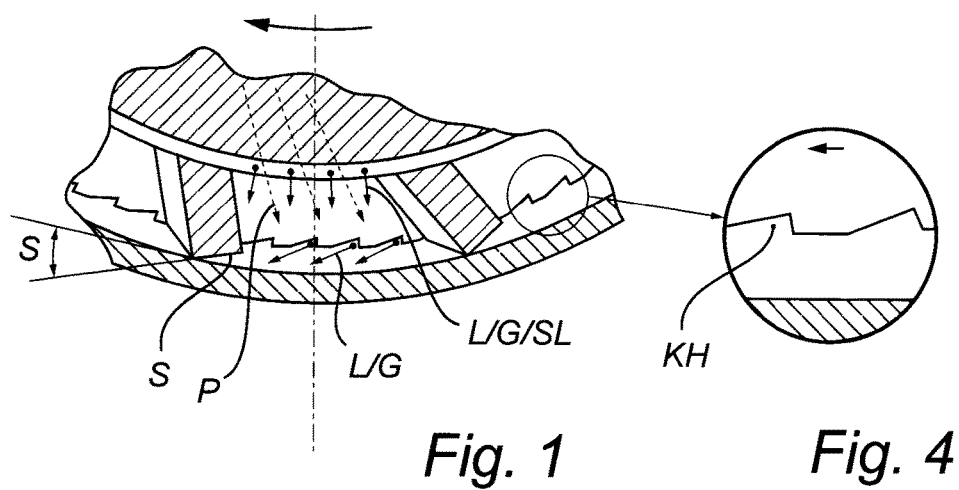
Fig. 3  Fig. 2a
Fig. 2b
Fig. 1  Fig. 4

DEVICE FOR MIXING POWDER AND AT LEAST ONE OTHER TYPE OF PHASE

FIELD OF THE INVENTION

The present invention is directed to a device for homogenous mixing of a powdered phase with another type of phase.

BACKGROUND

There are known devices intended for mixing of a powder with another type of phase. One such machine is the so called ejector mixer. Such a mixer may be used to moisten and disperse powder in liquids, e.g. by use of vacuum technology. Powder and much dispersed liquid from two different streams are mixed so that liquid particles are incorporated with powder particles. This is obtained by means of the powder being flowed through a liquid curtain. In an ejector mixer the reactive surface for both phases is intended to be maximized before contact is made between the two. In an ejector mixer the powder is transported by means of vacuum, with or without inert gas being present.

One of the major disadvantages with an ejector mixer is that it does not render any active mechanical processing (work up) of the material intended to be mixed. This is in view of the fact that the device does not comprise any means for such processing. Moreover, homogenous mixing is difficult to obtain.

The present invention is directed to a device comprising a unit for active mixing, below called agitator. One purpose of the present invention is further to provide a mixing device in which homogenous mixing is obtainable in an effective way.

SUMMARY OF THE INVENTION

The purpose above is obtained by the present invention, which refers to for mixing a mixture material comprising at least two different phases where at least one first phase is in powdered form, said device comprising at least two separate inlets where a first inlet is intended for powder and a second inlet is intended for a second phase not being a powder, wherein the device further comprises an outlet and a mixing chamber with an agitator, wherein the mixing chamber comprises a mixing zone being that part of the mixing chamber in which the mixture material is being actively mechanically influenced to obtain mixing, and wherein said at least two separate inlets each involve any type of geometrical narrowing of their cross-sectional areas up to the mixing zone, and wherein the mixing zone further comprises any type of expansion of the cross-sectional area in a flow direction of the mixture material.

With the expression "mixing material" is meant the input components being processed, i.e. that material being present in the mixing chamber and/or in the mixing zone.

The device according to the present invention causes the input phases or the mixing material never to return to an earlier point in the flow direction to be re-mixed. When input components come in contact with each other in the mixing zone for the first time, they will never get mixed only with its own kind on a minimum level, regardless of the proportions of the input components. This also prevents the formation of e.g. dry inclusions in the mixing result.

Furthermore, according to one embodiment the design of the present invention renders the narrowing of the inlets up to the mixing zone being arranged so that the input components (phases) being mixed only encounter one another by means of flow pressure and the affect of the agitator, so that random mixing is avoided. This implies that there is not any dead zone present where the components may be mixed spontaneously or remain unmixed.

Furthermore, a "narrowing" according to the present invention renders a static throttling. The expression "static throttling" may as such also be seen as a synonym to the expression "narrowing" in relation to the present invention.

It should further be mentioned that there exist other types of devices for mixing of powder and liquid which also comprise an agitator and which is based on a similar basic principle with reference to the mixing method. For instance in U.S. Pat. No. 4,329,066 there is disclosed a device for the continuously mixing of a liquid and powder for the formation of a substantially homogenous mixture. The device comprises a mixer housing, separate lines for the supply of liquid and powder, where the mixer housing further comprises a rotating wheel in which the liquid discharges into a cavity in the wheel (mixing chamber) while the powder line discharges into powder-accommodating spaces in the upper part of the wheel. This further implies that liquid and powder is not contacted in a mixing zone such as according to the present invention.

Furthermore, in U.S. Pat. No. 5,085,513 there is disclosed a similar device to that according to U.S. Pat. No. 4,329,066. The device according to U.S. Pat. No. 5,085,513 has a housing which has a conical surface, a rotor being journalled for rotation in the housing. The housing has a liquid inlet through which liquid is delivered to a gap between the housing and rotor surfaces, and a powder inlet through which powder is delivered to the upper surface of the rotor. As the rotor rotates, a liquid film is formed on the conical housing surface while, at the same time, powder is thrown onto the liquid film with the aid of rotor-carried guide vanes. The mixture is worked and pressed out through an outlet by wing-like elements carried by the rotor.

The narrowing of the cross-sectional area disclosed of each separate inlet up to the mixing zone and the subsequent expansion in the mixing zone is a key feature according to the present invention which is not shown according to U.S. Pat. No. 4,329,066 and U.S. Pat. No. 5,085,513. The device according to the present invention is designed so that the speed of the input components is increased without increasing the speed of the agitator. As such a homogenous mixing result is obtainable without an increased generation of heat, which instead may be the case when the speed of the agitator is increased. This is not incorporated in a similar way in the devices according to U.S. Pat. No. 4,329,066 and U.S. Pat. No. 5,085,513. This is one key difference when comparing the present invention to the devices presented in U.S. Pat. No. 4,329,066 and U.S. Pat. No. 5,085,513.

Furthermore, another decisive disadvantage with the devices according to U.S. Pat. No. 4,329,066 and U.S. Pat. No. 5,085,513 is that they are static, implying that they do not exhibit a possibility of easy adjustment to obtain a need-adapted mixing result. This is explained further below.

SHORT DESCRIPTION OF THE DRAWINGS

In FIG. 1 there is shown a cross-sectional view of a mixing chamber with the agitator and inlets according to the present invention. FIG. 4 shows a part of FIG. 1 seen enlarged.

Furthermore, in FIG. 2a with part enlarged in FIG. 2b and FIG. 3 there are shown details referring to a rotor according to different possible embodiments of the present invention.

In FIG. 5 there is shown a cross-sectional view of a device according to the present invention. This cross section is, what you may say is, perpendicular to the cross section shown in e.g. FIG. 1. For instance, FIG. 3 may be seen as a part of the view shown in FIG. 5.

Figure 6:
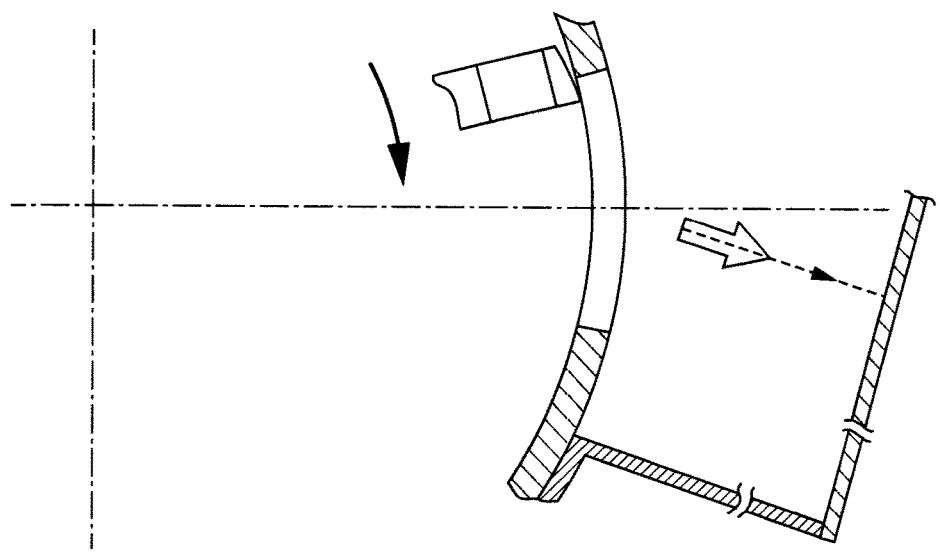

In FIG. 6 there is shown a substantially perpendicular exterior surface as a catcher for the mixed goods to hit after active mixing in the mixing device.

Figure 7:
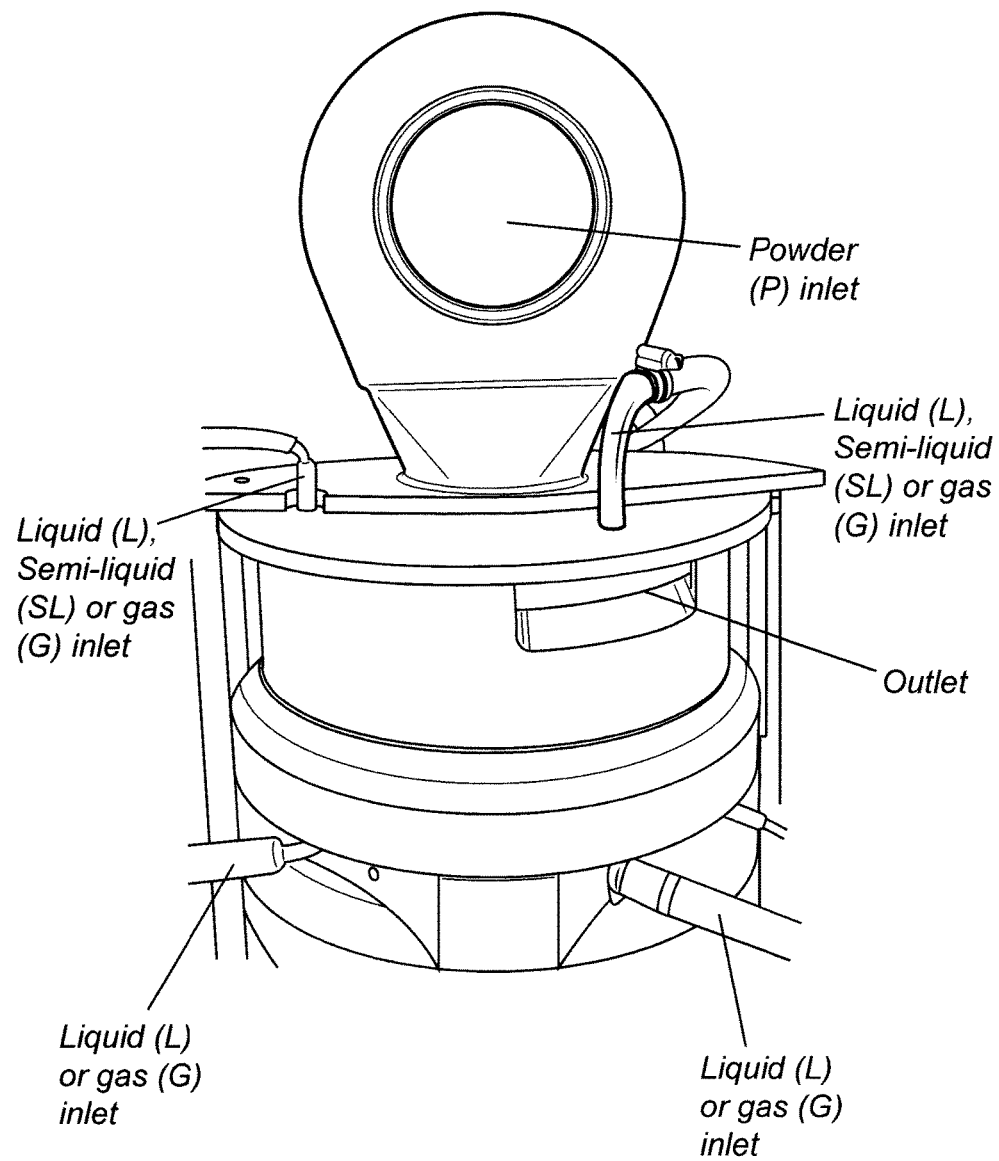

Furthermore, in FIG. 7 there is shown a real life embodiment of the mixing device according to the present invention.

SPECIFIC EMBODIMENTS OF THE INVENTION

Below specific embodiments of the present invention are disclosed.

As notable from above, the device is designed with narrowings of the cross-sectional areas of the inlets up to the mixing zone. These narrowings implies that the mixing of the input phases may be performed so that a homogenous active mixing is obtained. In addition to these narrowings also other portions or parts may also comprise narrowings. According to one specific embodiment, a narrowing of each inlet is provided directly before the mixing chamber. As notable, it may be of interest to obtain increased input phase speed and therefore to provide the narrowing(s) just before the mixing chamber.

According to another specific embodiment, an additional narrowing of the cross-sectional area of the mixing zone is arranged before the outlet. This is of interest as the mixture then is processed and/or squeezed out from the device to create a shaped product, such as later e.g. a granule or the like.

As notable from above, the device is adapted for mix a powder with at least one other type of phase. This other phase may be a liquid and/or gaseous phase. Examples of liquid phases of special interest are (cold) water and hot water. Examples of liquid phases are steam, inert gas or e.g. a cooling gas. According to one specific embodiment mixing of water and steam with a powder for the production of a processed flour is provided. In some cases also steam may be of great interest to use alone to sterilize mixing chamber and agitator. Thus, according to one specific embodiment, the device comprises at least three separate inlets for mixing a powdered, a liquid and a gaseous phase. In relation to this embodiment it should be mentioned that all of the inlets do not have to have narrowings, however at least two inlets are each provided with at least one such narrowing.

Moreover, the device according to the present invention may have different types of inlets. According to one specific embodiment, the device comprises at least two inlets intended for the same type of phase. According to one further specific embodiment, the device comprises at least two inlets intended for a liquid phase. The embodiment with multiple inlets provides a design where pre-mixing is redundant. Especially several liquid/semiliquid inlets may be of interest. For instance, if a doughy product material is intended, one liquid, such as water, may be entered from an inlet from underneath, at the beginning of the actual mixing zone, and a second liquid, such as oil, may be entered as late as possible in the mixing zone. In the case of a (bread) dough, this is of critical interest to enable generation of gluten formation.

A gas inflow may be of interest to be provided so that the gas is entered early in the flow direction. This may be valid in all gas use cases, such as for temperature control, energy transformation and when creating an inert environment, etc. The gas inlet may also be situated from beneath, and gas may be component flowed in in a normally liquid inlet. In the latter case, the actual gas should be seen as an active component, for instance for the purpose of oxygenation of a liquid. Please see FIG. 7 for different possibilities.

Furthermore, in connection to the discussion of a gaseous phase it may also be mentioned that the devices according to U.S. Pat. No. 4,329,066 and U.S. Pat. No. 5,085,513 miss inlets for gaseous phase, which implies that they are not adapted to use e.g. steam, inert gas or any cooling gas. The same is valid for several liquids, such as e.g. hot water, and also for cold water. The devices according to U.S. Pat. No. 4,329,066 and U.S. Pat. No. 5,085,513 have a static design and are not designed to use many different types of media. Water having a normal temperate seems to be the intended liquid to be mixed with a powder. Also this is a clear difference in comparison with the mixer concept according to the present invention.

The device according to the present invention may be adapted based on the intended use. According to one specific embodiment, the size of the cross-sectional area of at least one of or several of the inlets is adjustable. This is a development to even further increase the adjustability of the device without the need of changing or affecting other parts which may create a negative mixing result or increased heat generation or the like. The outlet may also be adjustable according to the present invention.

In this context it may also be explained that a narrowing according to the present invention provides a velocity increase, but also allows for the possibility to create a positive pressure or a negative pressure in inlets and the mixing chamber, respectively. According to one specific embodiment of the present invention, there is a valve provided for enabling regulation of a possible negative pressure in the inlet intended for powder. Such a valve is arranged to be in contact with the powder inlet of the device.

As notable from above, the mixing zone further comprises any type of expansion of the cross-sectional area in a flow direction of the mixture material. The expansion in the mixing chamber may create a negative pressure in the powder inlet. This also provides a fine scattering of the powder which provides for the possibility of homogenous mixing. A valve on the suction side for the powder may provide for regulation of said negative pressure.

The adjustability of the inlets and/or outlet may e.g. be created by incorporating the possibility of changing the narrowings and/or shape of the inlets and outlet at different points in the device according to the present invention. Furthermore, different parts of the device may be replaceable by others, such as e.g. the outlet where different degrees of narrowing may be provided. According to one specific embodiment of the present invention, the size of of at least one of or several of the inlets is adjustable. This is shown in FIG. 2a for the liquid side where the thick arrow having a direction up and down is intended to show this adjustability. It should be understood that the corresponding regulation of the inlets is possible for powder or gas. This is also something that is a clear difference in comparison with the devices according to U.S. Pat. No. 4,329,066 and U.S. Pat. No. 5,085,513.

This adjustability implies that a need-adjusted mixing result is obtainable. This may also imply that the processing or kneading degree may be affected.

Also other parameters may be regulated, such as e.g. the mixing temperature, which inter alia is enabled by the great possibility of using everything from cold to hot liquid, such as e.g. from cold water to hot water, and even steam.

The possible adjustability is one advantage with the present invention. This may be directed to production volume, such as by regulation of flow or rotation speed (rpms) of the agitator, the shape of the outlet or type of product, e.g. powder, dough, slurry, granule or extrudate, which is directed to the regulation of one or several of said narrowings or by the regulation of the rotation speed of the agitator. As notable from above, a regulation possibility which is totally directed to agitator speed is not preferable as this implies limitations or negative influence, e.g. increased or uncontrolled heat generation.

As mentioned above, other regulation areas are inter alia temperature, which according to the present invention may be made by changing the input phase(s), e.g. between water and steam, or instead by regulating the temperature. The latter may according to the present invention be obtained with double jacketing, which creates the possibility to cool or heat with a medium in the jacket.

Another interesting regulation area for achieving increased user-friendliness is increased efficiency when changing products.

In addition to the above mentioned advantage with increased adjustability, the mixer device according to the present invention also has other properties which may be of great interest. One such is the ability with the device according to the present invention to supply heat, energy and cooling directly into the mixing material in the mixing zone. This is also a clear difference in relation to the traditional methods and also e.g. U.S. Pat. No. 4,329,066 and U.S. Pat. No. 5,085,513 where the corresponding technology is provided by means of double jacketing or other type of heat exchange. This advantage according to the present invention implies that heat, energy or cold is an active component in the mixture. As such, components being difficult to mix may be processed more effectively, for example if they are mixed into the product after mixing. One example is if a frozen component is to be admixed after completed mixing. As the mixture may be cooled effectively during the mixing procedure, the frozen component may be admixed securely afterwards without the risk of thawing when that is unwanted.

Furthermore, the above mentioned advantage implies a more energy effective and inexpensive way to directly heat within the mixing material in comparison with heating an entire wanted temperature increase with an external method, such as heat exchanging.

Another parameter of interest related to the cross-sectional area is the ratio of the cross-sectional area of the agitator in relationship to the cross-sectional area of the mixing chamber. According to specific embodiment of the present invention, the agitator has a total cross-sectional area, being the projected area across the moving direction of the agitator, which is at least 80% of the cross-sectional area of the mixing chamber, which two cross-sectional areas are in the same geometrical plane. This design implies that no dead zone is present inside the mixing chamber where the agitator is not active. In other words, the agitator covers more or less the entire mixing space with its movement. Therefore, no components not being actively mixed will be present inside of the mixing chamber.

The agitator according to the present invention may be of different type. According to one specific embodiment, the agitator is a rotor comprising agitator wings (mixing vanes) having a leash. A leash may be provided to minimize unwanted mechanical friction against mixing chamber walls creating uncontrolled temperature raise in the mixed goods. The mixing vanes are positioned on the upper side of the rotor. Such a possible leash is shown in the drawings. According to yet another specific embodiment, the agitator is a rotor having liquid vanes on a bottom side, said liquid vanes being inclined. This is shown in FIG. 3. This inclination renders the liquid speed to increase, and as such the bottom side of the rotor may be seen as a liquid pump. According to this design, power is supplied in both tangential and axial direction. Also this design is different from the devices according to U.S. Pat. No. 4,329,066 and U.S. Pat. No. 5,085,513. The rotor according to U.S. Pat. No. 4,329,066 does not comprise liquid vanes, and according to U.S. Pat. No. 5,085,513 the liquid vanes of the rotor are straight. This does not give a speed increase.

According to yet another specific embodiment of the present invention, voids between tips of the liquid vanes are triangular, arranged to enable even further narrowing for the thin liquid film, without getting jammed by small particles in the liquid when entering the mixing chamber. It should be understood that the design in its self is not totally triangular as the corresponding line of the hypotenuse e.g. is curved for a circular slit. This type of design of the gaps or voids between the tips of the liquid vanes is shown in FIG. 2a and in part as enlarged in FIG. 2b. Moreover an increased narrowing may be obtained by having a triangular shape instead of a rectangular. It may also be mentioned that corresponding gaps for tips of the liquid vanes according to the device of U.S. Pat. No. 5,085,513 have a rectangular shape.

Also measures and distances inside of the device may be important to even further improve the efficiency of the mixing result for some usages. According to one specific embodiment, the device is designed so that a distance of the mixture material in millimeters inside of the mixing chamber to the agitator or the wall of the mixing chamber is at most 16+(agitator diameter (millimeters)/4). According to one specific embodiment, said distance is at most 16+ (agitator diameter (millimeters)/8). To visualize an example therefore, if the outer diameter of the agitator for instance is 240 millimeters, then the maximum distance is 46 millimeters. This further implies that there is not any point inside of the mixing chamber which has a greater distance to the walls of the mixing chamber or any part of the agitator than 46 millimeters.

In connection to this it should be mentioned that the outer diameter of the agitator may vary according to the present invention. According to one specific embodiment, the outer diameter of the agitator is in the range of 105-1500 millimeters, such as in the range of 105-955 millimeters. According to yet another specific embodiment, the outer diameter of the agitator is in the range of 175-600 millimeters, such as e.g. 175-490 millimeters being an optimal range in the food industry and pharmaceutical industry.

Moreover, it should be understood that the optimal relationship and also the physical distances may depend on the size of the mixing device. According to one specific embodiment, the device is designed so that the powdered phase, at the inlet to the mixing chamber, has a maximum distance in millimeters to inlet walls, walls of the mixing chamber or the agitator of 8+(agitator diameter (millimeters)/16). With the example given above, i.e. with an agitator having an outer diameter of 240 millimeters, then the maximum distance in the powder inlet is 23 millimeters. Furthermore, in that case this implies that there is no point in the powder inlet which is further away from the walls of the inlet or the walls of the mixing chamber or the agitator than 23 millimeters. According to yet another specific embodiment of the present invention, the device is designed so that the powdered phase, at the inlet to the mixing chamber, has a maximum distance in millimeters to inlet walls, walls of the mixing chamber or the agitator of (agitator diameter (millimeters)/16). So this implies that there is no point in an air space inside of the device having a distance to the closest situated part of the device exceeding (agitator diameter (millimeters)/16) for the powder side. The same is valid with respect to the other phases in accordance with the information given below.

According to yet another specific embodiment, the second phase is a liquid phase and the device is designed so that the liquid phase, at the inlet to the mixing chamber, has a maximum distance in millimeters to the inlet walls, walls of the mixing chamber or the agitator of 4+(agitator diameter (millimeters)/48). With an outer diameter of an agitator being 240 millimeters, then the maximum distance in this case is 9 millimeters in the liquid inlet. According to yet another specific embodiment of the present invention, the device is designed so that the liquid phase, at the inlet to the mixing chamber, has a maximum distance in millimeters to the inlet walls, walls of the mixing chamber or the agitator of (agitator diameter (millimeters)/100). According to one specific embodiment of the present invention said distance is at most 1.5 millimeters.

According to another specific embodiment, a gaseous phase is present and the device is designed so that the gaseous phase, at the inlet to the mixing chamber, has a maximum distance in millimeters to the inlet walls, walls of the mixing chamber or the agitator of 2+(agitator diameter (millimeters)/64). With an outer diameter of an agitator being 240 millimeters, then the maximum distance in this case is 5.75 millimeters in the gas inlet. According to yet another specific embodiment of the present invention, the device is designed so that the gaseous phase at the inlet to the mixing chamber, has a maximum distance in millimeters to the inlet walls, walls of the mixing chamber or the agitator of (agitator diameter (millimeters)/64). According to one specific embodiment of the present invention also this distance has a maximum of 1.5 millimeters.

The mixer device according to the present invention may further comprise an outlet which has several holes allowing for the production of granules, extrudate or spaghetti-shaped products. Depending on the intended product, the design of the outlet may vary. For instance, for granules and extrudates, then the hole design of the outlets is of great importance. Many cylindrical holes are suitable for the production of extrudates. A grid-shaped outlet design is suitable for granulation. If a doughy or pasty product is wanted, then the outlet may have e.g. one medium-sized hole, such as e.g. a tube. Such a larger hole may be suitable if a slurry is desired.

Furthermore, the device according to the present invention may also comprise further units. According to one embodiment, the outlet is connected to a receiver and transporter unit for a product material to be directed from the outlet to a kneading device where the product material is further processed. Moreover, a system according to the present invention, comprising the mixing device and a kneading device may also comprise additional units, such as for instance a conveyor belt being a part of the receiver and transporter unit positioned between the two units. Moreover, the actual receiver may have the form of a wall being perpendicular or almost perpendicular to a flow direction coming out from the outlet of the mixing device. This is explained further below.

Kneading may be of interest to obtain for certain mixing goods, such as e.g. when dough is produced for breads. The kneading may be obtained in different ways according to the present invention. As mentioned above, according to one embodiment of the present invention a kneading device is connected to the mixing device. It should, however, be understood that also the mixing device provides some degree of kneading depending on the design thereof. A later portion of the mixing zone, seen in the flow direction, also acts as a kneading portion. The cross section of the cone (see FIG. 5), first the mixing zone and then the cylinder acts as a kneading zone. After the "knee" (see FIG. 5 again) of the wing, then the actual kneading work up is occurring. Components intended to be combined with each other in chemical terms have to be mixed together substantially completely before this knee. Otherwise there is a risk for both undesired temperature increase in the mixed goods and a negative effect of the properties of the input components. The inclination and size of the cone should as such be adapted in relation to the input components to be mixed and combined, with reference to process flow direction before the actual kneading is occurring.

As such, according to the present invention it is possible to achieve both mixing and kneading together, regulated separately within the same chamber, according to the present invention. The height of the wings and the length of the lower edge of the outlet affect the degree of kneading. Also the height of the outlet affects the degree of kneading according to the present invention. If stiffer mixed goods is intended it is according to the present invention possible to change not only the proportions of the input components but also the width of the outlet. For instance both elasticity and stiffness of a wheat dough produced according to the present invention can be changed by amending the height and width of outlet. Furthermore, the actual shape of the outlet is also of importance in relation to the kind of product desired, e.g. dough, extrudate or granules, however this is another possibility of regulation and adjustment according to the present invention.

Furthermore, according to the present invention there is also provided a method for homogenous mixing of at least two different phases where at least one phase is in a powdered form, with use of a device according to the present invention, where the mixture material passes the mixing chamber in less than 10 seconds, preferably less than 4 seconds, e.g. less than 1.5 seconds, such as even less than 1.0 seconds. The present invention is directed to homogenous mixing, in particular continuous homogenous mixing. As such, it is of importance that the input components are not maintained together with other components without them being actively mixed. That is why the dwell time inside of the mixing chamber should not exceed 10 seconds.

Also other parameters may be of interest when operating the mixing device according to the present invention. According to one specific embodiment, the peripheral speed of the agitator is in the range of $(6*\pi - 20*\pi)$ m/s when being operated. ($\pi$ stands for pi). This range of peripheral speed of the agitator is linked to the regulation possibilities for achieving a homogenous mixing with a device according to the present invention. This works differently for other types of mixers, such as regular containers or injectors. According to yet another specific embodiment, the peripheral speed of the agitator is in the range of $(6.5*\pi - 17*\pi)$ m/s, such as e.g. of $(7*\pi - 14*\pi)$ m/s, when being operated.

In relation to the speed above it may be mentioned that there is a relationship between this speed and the obtained result. An adequate speed, such as in the ranges according to embodiments of the present invention presented above, is of importance in relation to several aspects. Firstly, it is a very short of time the active mixing is occurring, and therefore a high speed is needed to get sufficient result of mixing at a component level. Secondly, high speed is needed to fasten the surface chemical process(es) occurring during the mixing and kneading. An example thereof is gluten formation during the mixing and kneading of certain doughs. Furthermore, a too high speed may also give a negative result, e.g. undesired change in properties of starch when mixing a dough. In other words, it is not only a question of supplying mechanical energy to achieve an optimal mixing, also how the actual supply of energy is made during the mixing and kneading in relation to available time is of essence.

Another parameter of importance is the size of gaps/slots (see FIG. 5). If a large slot is arranged, then the speed must be decreased, relatively speaking. Specific embodiment according to the present invention are presented both directed to the speed (peripheral speed of the agitator) and the sizes of the gaps, the latter inter alia defined by the embodiments disclosing maximum distances to inlet walls, walls of the mixing chamber or the agitator for the different inlets.

One example where both these parameters are importance is for the binding of free water (non-bound water) in e.g. a dough. To reduce the amount of free water is of interest to decrease the risk of mould to occur on a dough or baked bread.

Furthermore, also external units may be of interest in relation to the method according to the present invention. As mentioned above, this may be the case when a dough for bread is the mixing goods to be produced. Therefore, according to one specific embodiment, an obtained product material is flowed out from the outlet to hit an exterior surface for kneading purposes. As hinted above, kneading may be seen as a possible application for affecting the consistency of a final product according to the present invention. Moreover, kneading may be obtained in different ways according to the present invention.

According to one specific embodiment, the exterior surface is a wall positioned at most 80 cm from the outlet. To obtain effective airing of the dough and also additional kneading the collision between dough bits and the surface may be important. Moreover, also the position of the wall may be of importance when regulating the intended consistency of the final product. According to one specific embodiment of the present invention, wherein the exterior surface is a wall being perpendicular or at most deviating 22 degrees from being perpendicular to a flow direction for the flow of the obtained product material flowed out from the outlet. See FIGS. 5 and 6 where a more or less perpendicular design is intended to be shown. The outlet may of course provide a flow direction which is directed somewhat upward or downward, however then the exterior wall of course may be inclined providing a more or less perpendicular design when being compared to the flow direction. This perpendicular design is of interest when a high kneading degree or effect is desired, such as when producing dough for bread. As hinted above, it is also of interest e.g. to get air into a dough while kneading. The suggested approach and arrangement according to the present invention may be compared to the well known French manual method when the baker beats a dough in a kneading table over and over again. According to the present invention this is obtained by the device as such and without any manual steps. In relation to this, the exterior surface, such as a steel plate, may be arranged to provide this kneading and airing effect.

It should of course be understood that also other wall position designs are possible according to the present invention, and for instance sliding designs, i.e. where the wall is not at all perpendicular to the flow direction, gives more gentle treatment of mixed products, which may be desirable for other final products than dough or the like. For instance, if the exterior wall surface is arranged at a distance of about 20 millimeters from the outlet and perpendicular thereto, a flowing product may be obtained, however if said wall is positioned far away from the outlet, such as about 500 millimeters, and inclined thereto, such as perhaps 50 degrees inclined downward, then granules may be produced. This great difference in the results obtained may be achieved although the mixing conditions otherwise are the same.

As mentioned above, the shape of the outlet can be changed in order to affect the type of product intended. Also the size of the outlet is relevant. According to one specific embodiment of the present invention, the maximum distance from one side of the outlet hole to the other side, in a cross sectional plane and through a geometrical centre of this cross sectional plane of the outlet hole, is at least 10% of the diameter of the agitator, and at least 25 millimeters. In relation to this distance of the outlet hole it should be said that the shape of the hole may vary, such as being oval and more or less totally circular. It may also be mentioned that the suitable size of the outlet hole is product dependent, and the size given above is e.g. very suitable for gluten based dough.

DETAILED DESCRIPTION OF THE DRAWINGS

In FIG. 1 there is shown a cross section of a mixing chamber with an agitator and inlets according to the present invention. According to this embodiment, the device comprises inlets for three different phases, namely powder shown with P, liquid shown as L and gas shown as G. The directions of the three input phases in the mixing chamber are also shown with arrows. This enables the understanding of how these phases enters the mixing chamber to be contacted with each other on a component level. Furthermore, the intended direction of motion of the agitator also shown, and S shows the leash in relation to the walls of mixing chamber.

As mentioned above, the rotor according to the present invention may be an agitator which is a rotor having liquid vanes in the bottom side. In FIG. 3, these liquid vanes VS are shown as inclined. Furthermore, in FIG. 2a there is shown that voids between tips of such liquid vanes may be triangularly shaped instead of e.g. being rectangular. This is shown as enlarged in FIG. 2b. This is also visualized in FIG. 4 which is an enlargement of a part in FIG. 1, and where it is also possible to see the triangular design. In FIG. 4 KH denotes the triangular design which may be of interest to be able to throttle further and at the same time ensure smaller particles in water to pass.

In FIGS. 1-4, the device is viewed from above. In FIG. 5 there is shown a cross-sectional view of a device according to the present invention, in this case seen from the side. It may be said that the part shown in FIG. 3 may be seen as a part of the entire part displayed in FIG. 5. As explained above, FIG. 5 shows the relationship between different portions of the mixing device according to the present invention. Furthermore, a possible external wall surface explained above is also shown. It may further be mentioned that SL stands for semi-liquid, as also shown in FIG. 7.

Moreover, in FIG. 6 there is shown a substantially perpendicular exterior surface as a catcher for the mixed goods to hit after active mixing in the mixing chamber.

Furthermore, in FIG. 7 there is shown a real life embodiment of the mixing device according to the present invention. The different inlets are explained in terms of possible type of phases.

The invention claimed is:

1. A device for mixing a mixture material comprising at least two different phases where at least one first phase is in powdered form, said device comprising at least two separate inlets where a first inlet is intended for powder and a second inlet is intended for a second phase not being a powder, wherein the device further comprises a mixing chamber with an agitator, a mixed goods outlet coupled to the mixing chamber, an exterior surface coupled to the mixing chamber, positioned in front of the mixed goods outlet, wherein the mixing chamber comprises a mixing zone being that part of the mixing chamber in which the mixture material is being actively mechanically influenced to obtain mixing, and wherein said at least two separate inlets each involve any type of geometrical narrowing of their cross-sectional areas up to the mixing zone, and wherein the mixing zone further comprises any type of expansion of the cross-sectional area in a flow direction of the mixture material;
wherein the agitator has a total cross-sectional area, being the projected area across the moving direction of the agitator, which is at least 80% of the cross-sectional area of the mixing chamber in the same geometrical plane;
wherein the mixed goods outlet is arranged so that an obtained product material from the mixing chamber is flowed out from the mixed goods outlet to hit the exterior surface such that the obtained product is redirected away from the mixed goods outlet.

2. The device according to claim 1, wherein a narrowing of each inlet is provided directly before the mixing zone.

3. The device according to claim 1, wherein an additional narrowing of the cross-sectional area of the mixing zone is arranged before the mixed goods outlet.

4. The device according to claim 1, wherein the second phase is a liquid and/or gaseous phase.

5. The device according to claim 1, wherein the device comprises at least three separate inlets for mixing a powdered, a liquid and a gaseous phase.

6. The device according to claim 1, wherein the device comprises at least two inlets intended for the same type of phase.

7. The device according to claim 6, wherein the device comprises at least two inlets intended for a liquid phase.

8. The device according to claim 1, wherein the size of the cross-sectional area of at least one of or several of the inlets is adjustable.

9. The device according to claim 1, wherein there is a valve provided for enabling regulation of a possible negative pressure in the inlet intended for powder.

10. The device according to claim 1, wherein the agitator is a rotor comprising agitator wings having a leash.

11. The device according to claim 1, wherein the agitator is a rotor having liquid vanes on a bottom side, said liquid vanes being inclined.

12. The device according to claim 11, wherein voids between tips of the liquid vanes are triangular.

13. The device according to claim 1, wherein the device is designed so that a distance of the mixture material in millimeters inside of the mixing chamber to the agitator or the wall of the mixing chamber is at most 16+(agitator diameter (millimeters)/4).

14. The device according to claim 1, wherein an outer diameter of the agitator is in the range of 105-955 millimeters.

15. The device according to claim 1, wherein an outer diameter of the agitator is in the range of 175-490 millimeters.

16. The device according to claim 1, wherein the device is designed so that the powdered phase, at the inlet to the mixing chamber, has a maximum distance in millimeters to inlet walls, walls of the mixing chamber or the agitator of 8+(agitator diameter (millimeters)/16).

17. The device according to claim 1, wherein the second phase is a liquid phase and wherein the device is designed so that the liquid phase, at the inlet to the mixing chamber, has a maximum distance in millimeters to the inlet walls, walls of the mixing chamber or the agitator of 4+(agitator diameter (millimeters)/48).

18. The device according to claim 1, wherein a gaseous phase is present and wherein the device is designed so that the gaseous phase, at the inlet to the mixing chamber, has a maximum distance in millimeters to the inlet walls, walls of the mixing chamber or the agitator of 2+(agitator diameter (millimeters)/64).

19. The device according to claim 1, wherein the mixed goods outlet is connected to a receiver and transporter unit for a product material to be directed from the mixed goods outlet to a kneading device where the product material is further processed.

20. Method for homogenous mixing of at least two different phases where at least one phase is in a powdered form, with a device according to claim 1, wherein the mixture material passes the mixing chamber in less than 10 seconds.

21. Method for homogenous mixing of at least two different phases where at least one phase is in a powdered form, with a device according to claim 1, wherein the peripheral speed of the agitator is in the range of
(6*π–20*π) m/s when being operated.

22. Method for homogenous mixing of at least two different phases where at least one phase is in a powdered form, with a device according to claim 1, wherein an obtained product material is flowed out from the outlet to hit an exterior surface for kneading purposes.

23. The method according to claim 22, wherein the exterior surface is a wall positioned at most 80 cm from the outlet.

24. The method according to claim 22, wherein the exterior surface is a wall being perpendicular or at most deviating 22 degrees from being perpendicular to a flow direction for the flow of the obtained product material flowed out from the outlet.

25. The device of claim 1, wherein the exterior surface is a wall positioned in front of the mixed goods outlet, wherein the wall is either perpendicular or, at most, deviating 22 degrees from being perpendicular, to a flow direction for the flow of the obtained product material flowed out of the outlet.

26. The device of claim 25, wherein the wall is positioned at most 80 cm from the outlet.

* * * * *